United States Patent [19]

Dick

[11] Patent Number: 4,944,544

[45] Date of Patent: Jul. 31, 1990

[54] VEHICLE ACCESSORY STORAGE DEVICE

[76] Inventor: Scott W. Dick, 524 Chatham Park Dr., Apt. 2A, Pittsburgh, Pa. 15220

[21] Appl. No.: 370,180

[22] Filed: Jun. 23, 1989

[51] Int. Cl.$^5$ .............................................. B60R 5/04
[52] U.S. Cl. .............................. 296/37.1; 224/42.42; 224/42.46 R; 248/206.1; 248/224.2
[58] Field of Search ............................. 296/37.1, 37.16; 224/42.42, 42.45 R, 42.46 R; 220/22.3; 248/206.1, 224.1, 224.2; 410/144–147

[56] References Cited

U.S. PATENT DOCUMENTS

| | | | |
|---|---|---|---|
| 3,473,680 | 10/1969 | Downer | 296/37.1 X |
| 4,136,904 | 1/1979 | Lauderdale | 296/37.1 |
| 4,171,078 | 10/1979 | Morgan | 224/42.46 R |
| 4,179,153 | 12/1979 | Cole | 296/37.1 |
| 4,416,483 | 11/1983 | Koch | 296/37.1 |
| 4,436,215 | 3/1984 | Kleinert et al. | 220/22.3 |
| 4,660,880 | 4/1987 | Walter | 296/37.1 |
| 4,728,017 | 3/1988 | Mulligan | 224/42.42 |
| 4,883,302 | 11/1989 | McCain | 296/37.1 |

FOREIGN PATENT DOCUMENTS

| | | | |
|---|---|---|---|
| 1937140 | 2/1971 | Fed. Rep. of Germany | 224/42.45 R |
| 2140164 | 2/1973 | Fed. Rep. of Germany | 224/42.42 |
| 2701786 | 7/1978 | Fed. Rep. of Germany | 296/37.1 |
| 3103704 | 8/1982 | Fed. Rep. of Germany | 296/37.1 |
| 3106116 | 12/1982 | Fed. Rep. of Germany | 296/37.16 |
| 1333555 | 10/1973 | United Kingdom | 248/200.1 |

*Primary Examiner*—Dennis H. Pedder
*Attorney, Agent, or Firm*—Jerry T. Kearns

[57] ABSTRACT

A vehicle accessory storage device is formed as an elongated rectangular receptacle and has extensible rods mounted for vertical adjustment on exterior opposite end walls. The extensible rods each include a threadably adjustable foot member which is biased outwardly by a coil spring for engagement with opposite interior side walls within a vehicle trunk. The receptacle includes a pair of hingedly connected storage loops for hanging the receptacle on a wall when not in use, a plurality of spaced resilient hooks for securing an elongated windshield brush and scraper, and a hollow interior having a laterally adjustable divider forming compartmentalized storage for various vehicle accessory items.

11 Claims, 3 Drawing Sheets

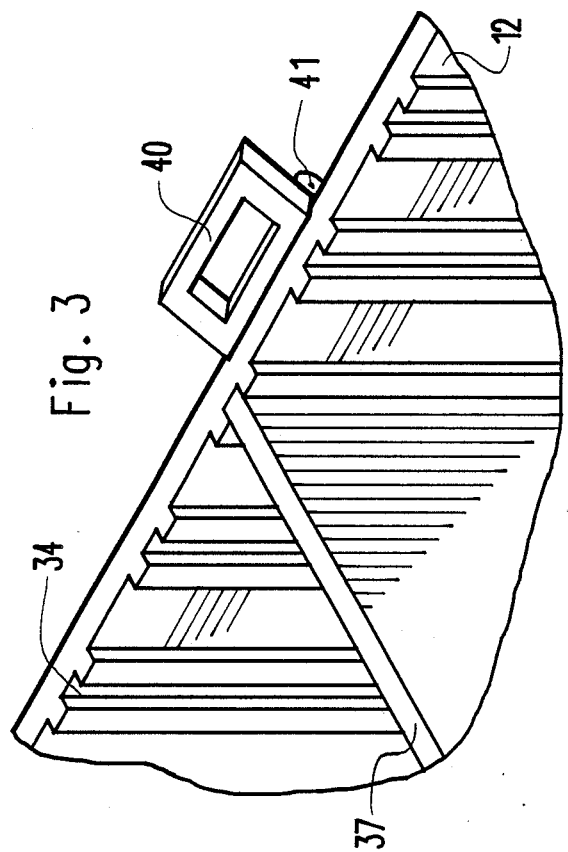
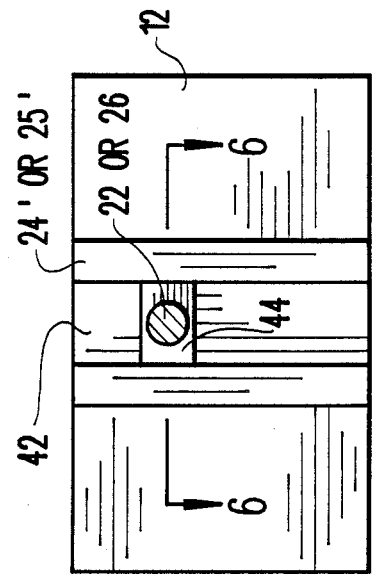
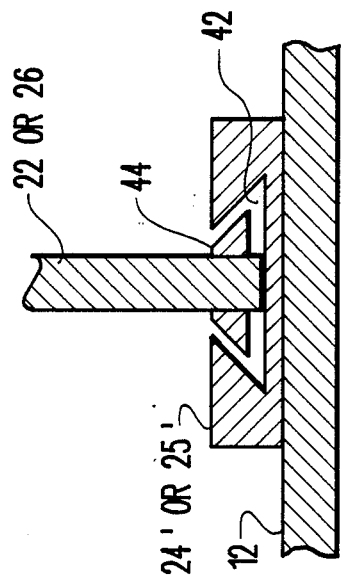
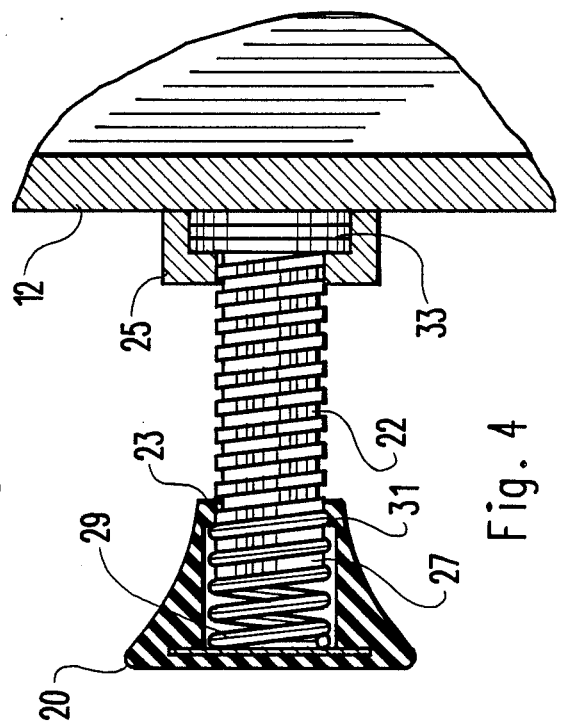

VEHICLE ACCESSORY STORAGE DEVICE

BACKGROUND OF THE INVENTION

1. Field of the Invention

The present invention relates to vehicle accessory storage devices, and more particularly pertains to a storage receptacle adapted for mounting within a conventional vehicle trunk to provide convenient and organized storage for vehicle accessory items such as windshield cleaning brushes, oil containers, jumper cables, and various tools. The typical vehicle trunk has an inner end portion adjacent the vehicle wheel well which is of limited use because of a diminished vertical and lateral spacing created by the convex wheel well surfaces. The present invention provides a storage receptacle adapted for mounting in this trunk area in order to conserve the more usable portion of the trunk space for storing and transporting other items such as luggage.

2. Description of the Prior Art

Various types of vehicle accessory storage devices are known in the prior art. A typical example of such a vehicle accessory storage device is to be found in U.S. Pat. No. 3,473,680, which issued to D. Downer on Oct. 21, 1969. This patent discloses an adjustable telescopic shelf which is adapted to be swingably attached to the underside of a vehicle trunk lid to utilize normally "dead" space. U.S. Pat. No. 4,136,904, which issued to C. Lauderdale on Jan. 30, 1979, discloses a tool and storage compartment adapted to be affixed under the hood of vehicles to the internal surface of the fender wheel cover. The device includes an elongated body having a hinged cover including a switch to activate a lamp when opened. U.S. Pat. No. 4,179,153, which issued to B. Cole on Dec. 18, 1979, discloses a tool box adapted for mounting under the hood of an automobile having a truck type front. A window washing bottle normally connected to the side wall of the automobile is disconnected, and a side of the tool box carrying apparatus is connected in the location where the window washing bottle was formerly connected. U.S. Pat. No. 4,416,483, which issued to A. Koch on Nov. 22, 1983, discloses an arrangement for storing objects in a trunk of a vehicle including a wall element arranged at an inner surface of a trunk cover and movable relative to the ladder between a closed position in which it forms a closed compartment, and an open position in which the compartment is open. U.S. Pat. No. 4,660,880, which issued to B. Walter on Apr. 28, 1987, discloses a storage box for tools which is mounted adjacent the interior side of a front quarter panel and over the curved surface of a vehicle fender well.

While the above mentioned devices are directed to vehicle accessory storage receptacles, none of these devices disclose a storage receptacle adapted for mounting in the inner portion of a vehicle trunk and including extensible rods for engagement with opposite interior walls of the vehicle trunk. Additional features of the present invention, not contemplated by the aforesaid devices, include the provision of a compound adjustment mechanism allowing both vertical and lateral adjustment of the securing rods and the provision of a compartmentalized interior having an adjustable divider providing organized storage for various vehicle accessory items. Inasmuch as the art is relatively crowded with respect to these various types of vehicle accessory storage devices, it can be appreciated that there is a continuing need for and interest in improvements to such vehicle accessory storage devices, and in this respect, the present invention addresses this need and interest.

SUMMARY OF THE INVENTION

In view of the foregoing disadvantages inherent in the known types of vehicle accessory storage devices now present in the prior art, the present invention provides an improved vehicle accessory storage device. As such, the general purpose of the present invention, which will be described subsequently in greater detail, is to provide a new and improved vehicle accessory storage device which has all the advantages of the prior art vehicle accessory storage devices and none of the disadvantages.

To attain this, representative embodiments of the concepts of the present invention are illustrated in the drawings and make use of a vehicle accessory storage device including an elongated rectangular receptacle having extensible rods mounted for vertical adjustment on exterior opposite end walls. The extensible rods each include a threadably adjustable foot member which is biased outwardly by a coil spring for engagement with opposite interior side walls within a vehicle trunk. The receptacle includes a pair of hingedly connected storage loops for hanging the receptacle on a wall when not in use, a plurality of spaced resilient hooks for securing an elongated windshield brush and scraper, and a hollow interior having a laterally adjustable divider forming compartmentalized storage for various vehicle accessory items.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle accessory storage device which has all the advantages of the prior art vehicle accessory storage devices and none of the disadvantages.

It is another object of the present invention to provide a new and improved vehicle accessory storage device which may be easily and efficiently manufactured and marketed.

It is a further object of the present invention to provide a new and improved vehicle accessory storage device which is of a durable and reliable construction.

An even further object of the present invention is to provide a new and improved vehicle accessory storage device which is susceptible of a low cost of manufacture with regard to both materials and labor, and which accordingly is then susceptible of low prices of sale to the consuming public, thereby making such vehicle accessory storage devices economically available to the buying public.

Still yet another object of the present invention is to provide a new and improved vehicle accessory storage device which provides in the apparatuses and methods of the prior art some of the advantages thereof, while simultaneously overcoming some of the disadvantages normally associated therewith.

Still another object of the present invention is to provide a new and improved vehicle accessory storage device which is adapted for mounting within the inner portion of a vehicle trunk to provide organized storage for vehicle accessory items.

Yet another object of the present invention is to provide a new and improved vehicle accessory storage device which includes a compound adjustable mounting mechanism allowing adaptation for use with various differently dimensioned vehicles.

Even still another object of the present invention is to provide a new and improved vehicle accessory storage device having a compartmentalized interior with an adjustable divider for providing organized user adjustable storage space for a variety of vehicle accessory items.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged partial perspective detail view further illustrating the vehicle accessory storage device of the present invention.

FIG. 4 is a cross sectional detail view illustrating the construction of the extensible mounting rod.

FIG. 5 is an end view of the storage receptacle illustrating an alternative vertically adjustable mounting of the extensible securement rod.

FIG. 6 is a partial cross sectional view, taken along line 6—6 of FIG. 5.

DESCRIPTION OF THE PREFERRED EMBODIMENT

Figure 1:
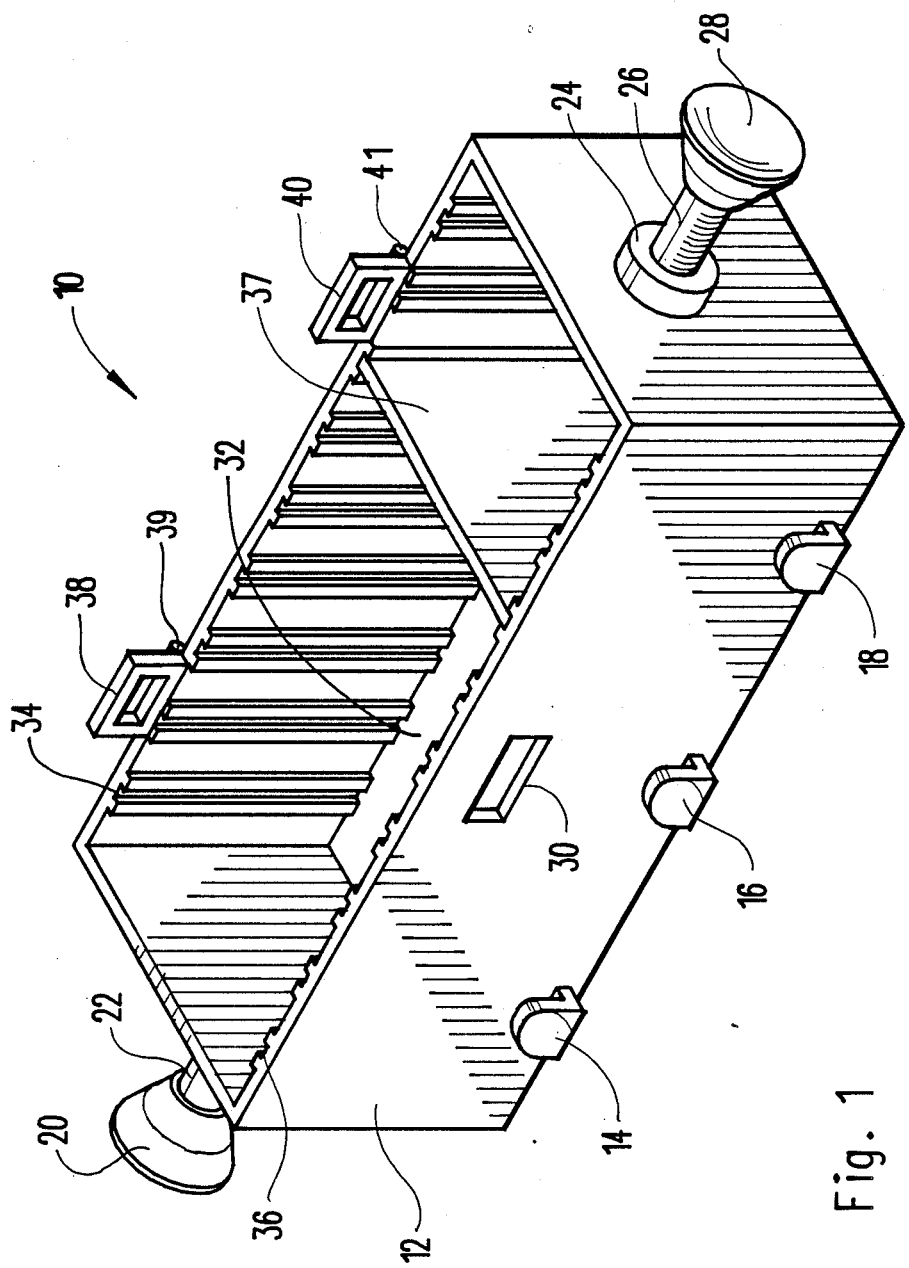
FIG. 1 is a perspective view of the vehicle accessory storage device of the present invention.

With reference now to the drawings, and in particular to FIG. 1 thereof, a new and improved vehicle accessory storage device embodying the principles and concepts of the present invention and generally designated by the reference numeral 1 will be described.

More specifically, it will be noted that the first embodiment 10 of the invention includes an elongated, open topped rectangular receptacle 12. A plurality of resilient plastic hook members 14, 16 and 18 are spaced along a lower front edge of the receptacle 12 for securing a conventional combination windshield cleaning brush and scraper. Laterally extensible mounting rods 22 and 26 are secured to opposite exterior end walls of the receptacle 12 and include respective adjustable resilient foot members 20 and 28 adapted for engagement with interior side wall portions within a vehicle trunk. A mounting boss 24 is provided for securing the rods 22 and 26 to the respective receptacle end faces. A rectangular cut-out portion 30 is provided in a front face of the receptacle 12 for receiving a securement strap or cord for optional use in retaining items within the interior 32 of the receptacle 12. A plurality of vertically extending notches or grooves 34 and 36 are spaced along the length of the interior portion of the receptacle 12 for adjustably receiving a divider plate 37. A plurality of dividers 37 may be provided and utilized to compartmentalize the interior storage space 32 as required. A pair of hinged rectangular loops 38 and 40 are secured by respective hinges 39 and 41 to a back wall of the receptacle 12 for movement between the illustrated operative position and a retracted storage position. The loops 38 and 40 may be utilized to hang the receptacle 12 on a vertical garage wall when the device is not in use.

Figure 2:
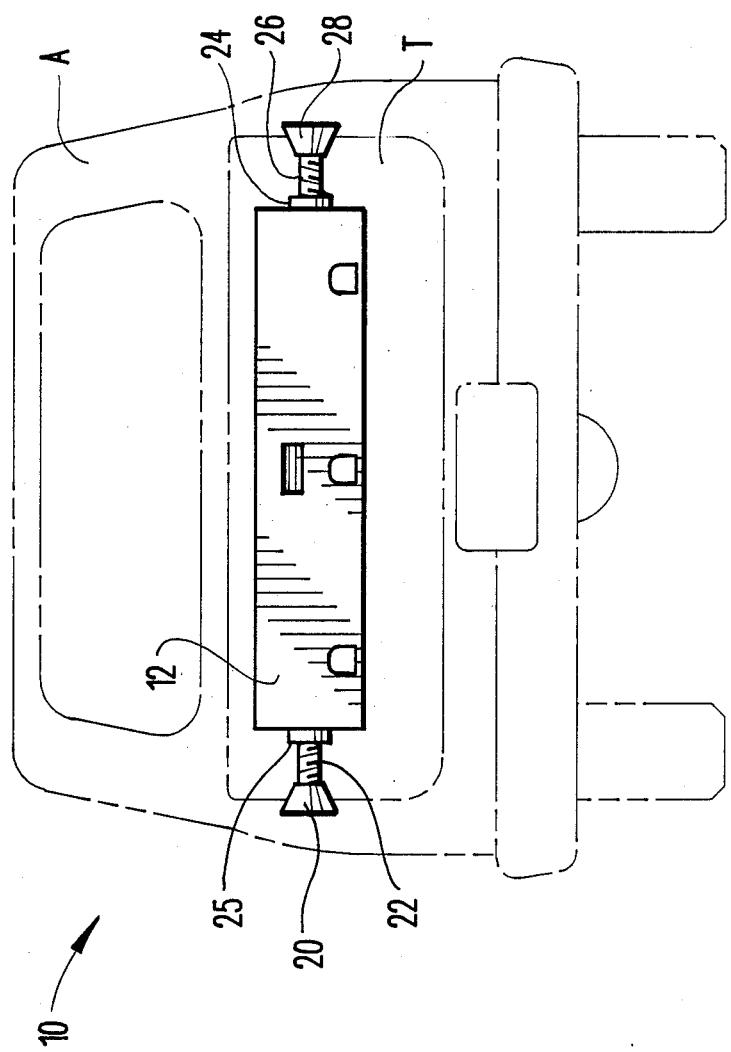
FIG. 2 is an elevational view diagrammatically illustrating the vehicle accessory storage device of the present invention installed in the trunk of a vehicle.

FIG. 2 is a diagrammatic illustration which depicts the accessory storage device 10 installed within a trunk portion T of an automobile A. The extensible mounting rods 22 and 26 are secured by respective boss members 24 and 25 to opposite end faces of the receptacle 12. The resilient foot members 20 and 28 are in engagement with interior side walls of the trunk T, thus securing the receptacle 12 in the inner portion of the trunk T. This allows the rearward portion of the trunk space to be kept free for storing other items such as luggage. It should be noted that many vehicles store a spare tire in the inner area of the trunk T and the adjustable extensible rods 22 and 26 allow the receptacle 12 to be secured in a position above the location of the spare tire to utilize otherwise wasted storage space.

FIG. 3 is a partial perspective detail view which illustrates the pivotal mounting of the securement loop 40 by the hinge 41 and also illustrates the rectangular divider plate 37 received in adjusted position between aligned vertical grooves.

FIG. 4 is cross sectional view which illustrates the mounting of the extensible rod 22 on an end face of the receptacle 12. A hollow cylindrical mounting boss 25 includes a captured cylindrical nut 33 which receives a threaded inner end of the rod 22. The rod 22 is provided with a coarse pitched thread and a coil spring 29 is threadably engaged with a distal end of the rod 22. The foot member 20 is preferably formed from a resilient rubber material and has a hollow interior portion which terminates in a rigid abutment plate 21 received in a circular undercut groove. A collar portion 23 of the foot member 20 is provided with a reinforced threaded nut configured for threaded engagement with the distal end portion of the rod 22. An internal annular ledge 31 formed within the hollow interior portion of the foot member 20 serves as a retaining flange to capture the spring 29. The relatively coarse pitch of the threads on the rod 22 allows for limited non-rotary axial movement of the foot member 20 with respect to the rod 22. The coil spring 29 takes up this axial slack by outwardly biasing the foot member 20 by abutment with the plate 21. Thus, the foot member 20 will be forced axially outwardly for engagement with interior side wall portion of a vehicle trunk. The foot member 20 and spring 29 forms an extensible portion of the rod 22 which allows axial adjustment to accommodate variously different dimensioned vehicle trunks. The limited spring biased axial mounting of the foot member 20 provides a secure frictional mounting arrangement, while affording the aforementioned adjustment.

FIG. 5 is an end view representing the symmetric construction of both opposite ends of the receptacle 12, with the threaded rod 22 (or 26 at the opposite end) illustrated in cross section, with the foot member 20 (or 28 at the opposite end) cut away. The inner end of the threaded rod 22 (or 26) is threadably engaged with a dovetail clamp nut 44 received for reciprocal vertical adjustment within a dovetail groove 42 formed in a modified rectangular form of mounting block 25' (or 24').

As illustrated in the cross sectional view of FIG. 6, the dovetail nut 44 will be clamped in a selected adjusted position upon rotation of the threaded rod 22 (or 26). This allows the height of the storage receptacle 12 to be adjusted within a vehicle trunk to accommodate various vehicle wheel well curvatures and floor plan configurations.

As may now be understood, the present invention provides an extremely adaptable vehicle accessory storage receptacle which may be adjusted for use with a wide variety of differently configured vehicles. The receptacle allows organized and convenient storage of vehicle accessory items such as tools, combination windshield brush and scraper, oil containers and jumper cables.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle accessory storage device adapted for securement in a vehicle trunk, comprising:
   an elongated open top rectangular receptacle;
   an extensible rod mounted at each of two opposite exterior end walls of said receptacle for engagement with opposite interior side walls of a vehicle trunk;
   a dovetail groove extending vertically along each of said end walls of said receptacle;
   a complementary formed clamp nut slidably received in each of said grooves; and
   an inner end portion of said rods in threaded engagement with said clamp nuts to allow selective vertical adjustment of said rods along said grooves.

2. The vehicle accessory storage device of claim 1, further comprising:
   a coarse pitched thread formed on each of said rods;
   a coil spring threadably engaged around a distal end portion of each of said rods; and
   a foot member threadably engaged on said distal end portion of each of said rods and having a hollow interior portion receiving an outer end of said coil spring, whereby said foot member is threadably adjustable along said rod and biased outwardly by said spring.

3. The vehicle accessory storage device of claim 1, further comprising compartmentalized storage means in said receptacle for storing vehicle accessory items.

4. The vehicle accessory storage device of claim 3, wherein said compartmentalized storage means comprises at least one laterally adjustable divider.

5. The vehicle accessory storage device of claim 4, further comprising a plurality of pairs of vertical grooves dimensioned to receive said divider.

6. The vehicle accessory storage device of claim 1, further comprising securement means on an exterior portion of said receptacle for removably retaining a vehicle windshield cleaning brush and scraper.

7. The vehicle accessory storage device of claim 6, wherein said securement means comprises a plurality of spaced resilient hooks.

8. The vehicle accessory storage device of claim 1, further comprising storage loop means on said receptacle for hanging said receptacle in a storage location.

9. The vehicle accessory storage device of claim 8, wherein said storage loop means comprises a pair of hinged loops on a back wall of said receptacle.

10. The vehicle accessory storage device of claim 1, further comprising a resilient foot member on a distal end of each of said rods.

11. The vehicle accessory storage device of claim 10, further comprising spring means outwardly biasing each of said foot members with respect to said rods.

* * * * *